(12) United States Patent
Dhuse et al.

(10) Patent No.: US 10,169,082 B2
(45) Date of Patent: Jan. 1, 2019

(54) ACCESSING DATA IN ACCORDANCE WITH AN EXECUTION DEADLINE

(71) Applicant: International Business Machines Corporation, Armonk, NY (US)

(72) Inventors: Greg R. Dhuse, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/139,776

(22) Filed: Apr. 27, 2016

(65) Prior Publication Data

US 2017/0315843 A1 Nov. 2, 2017

(51) Int. Cl.
G06F 9/48 (2006.01)
G06F 11/07 (2006.01)
G06F 13/42 (2006.01)

(52) U.S. Cl.
CPC .......... *G06F 9/4887* (2013.01); *G06F 9/4818* (2013.01); *G06F 11/0727* (2013.01); *G06F 11/0769* (2013.01); *G06F 13/4221* (2013.01)

(58) Field of Classification Search
CPC .. G06F 9/4887; G06F 9/4818; G06F 11/0727; G06F 11/0769; G06F 13/4221
See application file for complete search history.

(56) References Cited

U.S. PATENT DOCUMENTS

| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Emerson C Puente
*Assistant Examiner* — Jonathan R Labud
(74) *Attorney, Agent, or Firm* — Garlick & Markison; Timothy W. Markison; Bruce E. Stuckman

(57) ABSTRACT

A method begins by a processing module of a dispersed storage and task (DST) execution unit receiving a data request for execution by the DST execution unit, the data request including an execution deadline. The method continues with the processing module comparing the execution deadline to a current time. When the execution deadline compares unfavorably to the current time the method continues with the processing module generating an error response. When the execution deadline compares favorably to the current time the method continues with the processing module determining a priority level based on the deadline and executing the data request in accordance with the priority level.

16 Claims, 7 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0320482 A1* | 12/2008 | Dawson ............... G06F 9/5027 718/104 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0213928 A1* | 9/2011 | Grube ............... G06F 11/1076 711/114 |
| 2014/0281008 A1* | 9/2014 | Muthiah ............ H04L 29/0651 709/231 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th USENIX Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed computing system 10

ACCESSING DATA IN ACCORDANCE WITH AN EXECUTION DEADLINE

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

SUMMARY

According to an embodiment of the present invention, a method includes a processing module of a dispersed storage and task (DST) execution unit receiving a data request for execution by the DST execution unit, the data request including an execution deadline. The method continues with the processing module comparing the execution deadline to a current time. When the execution deadline compares unfavorably to the current time the method continues with the processing module generating an error response. When the execution deadline compares favorably to the current time the method continues with the processing module determining a priority level based on the deadline and executing the data request in accordance with the priority level.

BRIEF DESCRIPTION OF THE SEVERAL VIEWS OF THE DRAWING(S)

DETAILED DESCRIPTION OF THE INVENTION

Figure 1:
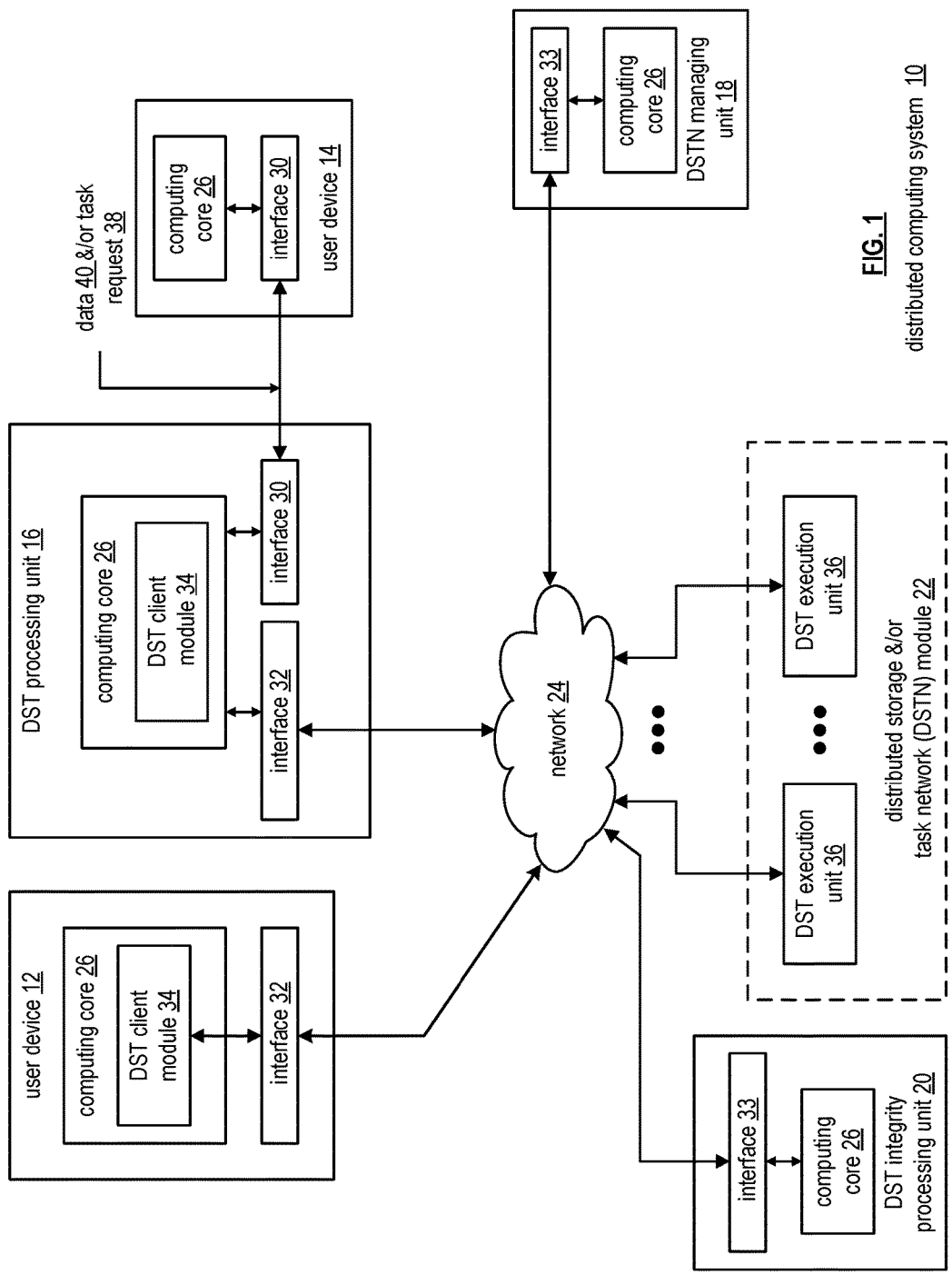
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public interne systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts to access the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
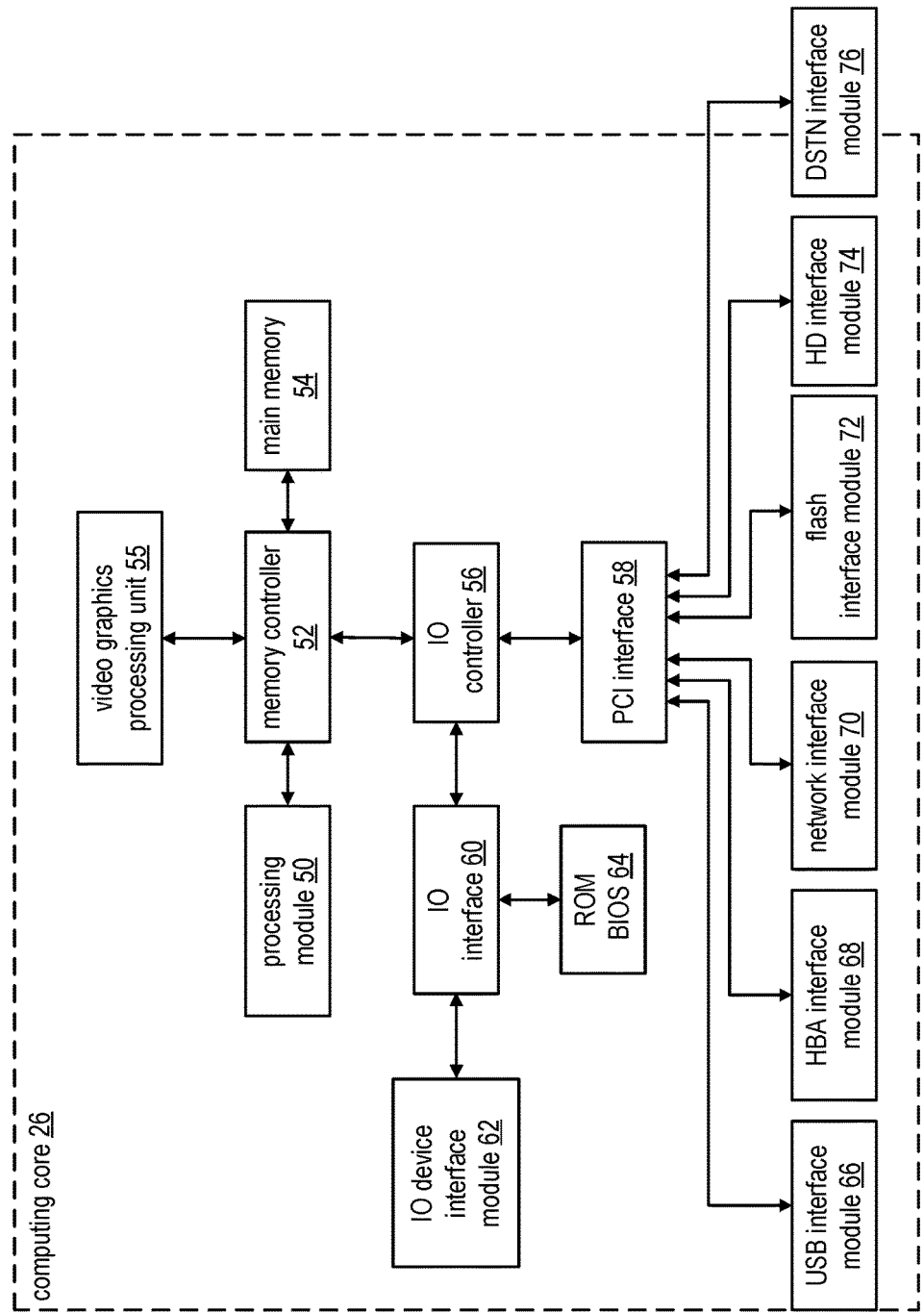
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

FIGS. 3-6 are schematic block diagrams of an embodiment of a dispersed storage network (DSN) that includes distributed storage and task (DST) processing unit 1-2, the network 24 of FIG. 1, and a set of DST execution units 1-n. Each DST processing unit 1-2 includes the DST client module 34 of FIG. 1. Each DST processing unit 1-2 may be implemented with the DST processing unit 16 of FIG. 1. Each DST execution unit includes the processing module 50 of FIG. 2 and a memory 88. The memory 88 may be implemented utilizing one or more of solid-state memory, magnetic disk drive memory, optical disk drive memory, etc. Together, the processing module 50 and memory 88 may be referred to as a processing system. Hereafter, the set of DST execution units may be interchangeably referred to as a set of storage units. The DSN functions to access data in accordance with an execution deadline, where the accessing of the data includes storing the data in the set of DST execution units and retrieving stored data from the set of DST execution units.

Figure 3:
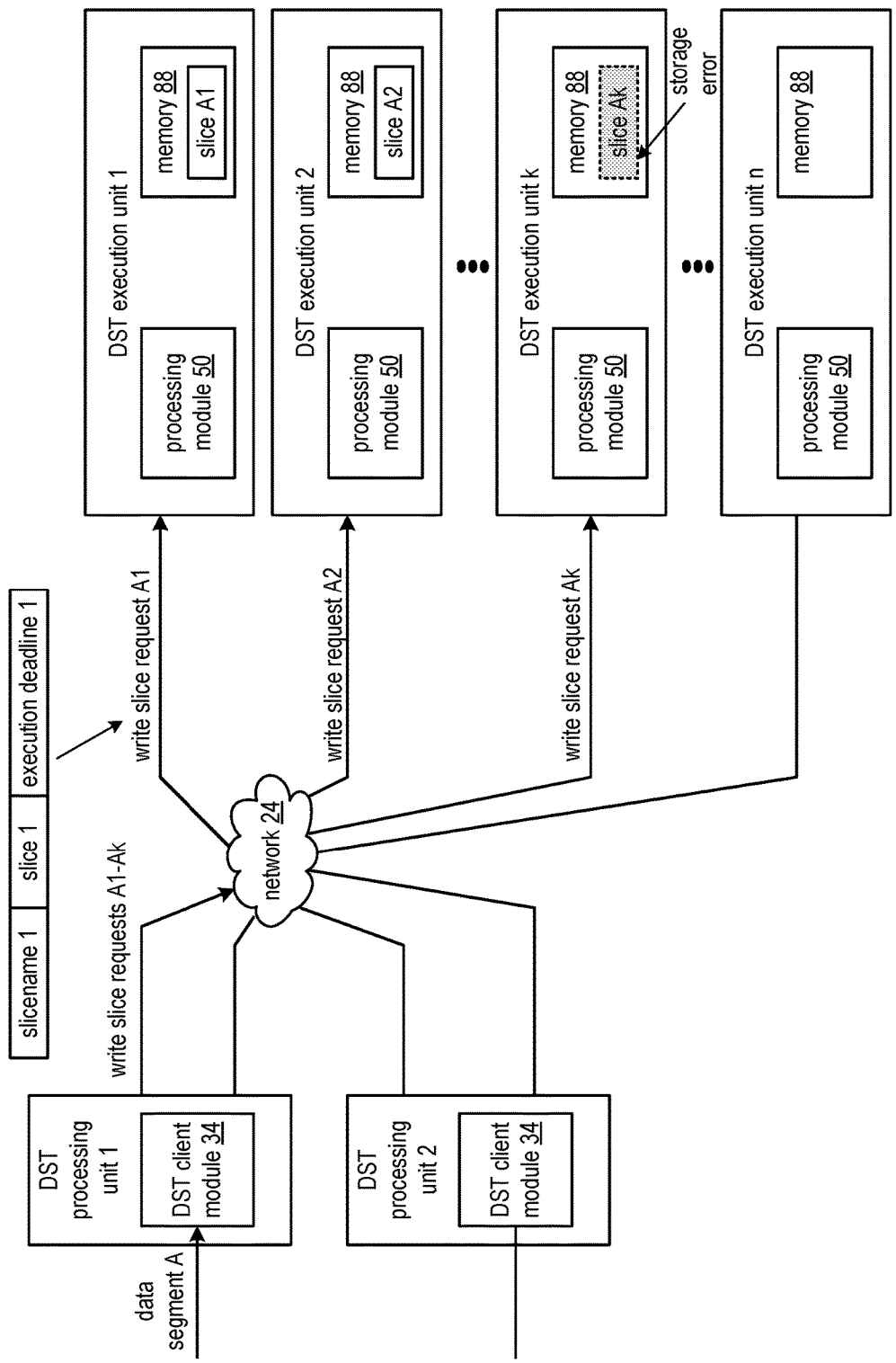
FIGS. 3-6 are schematic block diagrams of an embodiment of a dispersed storage network (DSN) in accordance with the present invention.

FIG. 3 illustrates an example of operation of the accessing of the data where the accessing includes the storing of the data. The DST client module 34 receives a data segment A for storage and performs a dispersed storage error encoding function on the data segment A to produce a set of encoded data slices A1-An, where an information dispersal algorithm (IDA) width of the dispersed storage error encoding function includes n encoded data slices, and where a decode threshold number k of encoded data slices are required to recover the data segment A. Having produced the set of encoded data slices, the DST client module 34 generates a set of slice names corresponding to the set of encoded data slices.

Having generated the set of slice names, the DST client module 34 determines an execution deadline for the accessing of the data, where the data corresponding to the data segment is time sensitive and where the execution deadline represents a time when value of the data is reduced, e.g when it is no longer of value or is of less value in relation to the time the data segment is received or the encoded data slices are created. The execution deadline includes at least one of an absolute time and an incremental amount of time from a current time. The determining of the execution deadline includes at least one of determining a unique corresponding execution deadline for each of the storage units or determining a common execution deadline for the set of storage units.

The determining of the execution deadline further includes one or more of identifying a maximum allowable aging of the data segment A, interpreting a request, interpreting system registry information, and estimating a processing duration of the accessing of the data by one or more of the storage units. Having determined the execution deadline, the DST client module 34 issues a threshold number of data requests to the set of storage units. For example, when storing the data, the DST client module 34 issues write slice requests to corresponding DST execution units of the set of DST execution units, where each write slice request includes a corresponding slice name of the set of slice names, a corresponding encoded data slice of the set of encoded data slices, and the execution deadline for at least one of the storage units. For example, the DST client module 34 generates a write slice request A1 that includes a slice name 1, encoded data slice 1, and an execution deadline 1; and sends, via the network 24, the write slice request A1 to the DST execution unit 1 and operates similarly for the remaining write slice requests.

Each DST execution unit (1-k) receives a data request for execution by the DST execution unit, where the data request includes the execution deadline. In the example shown, the data request includes aa write request (e.g., a write slice request) to write one of a threshold number of data slices (e.g., a decode threshold number k) in the DST execution unit. In other example however, the data request could be either a read request to read one of the threshold number of data slices from the DST execution unit, a listing request (e.g., to generate a listing response that includes revisions of stored encoded data slices) or other data request. DST execution units receiving a corresponding write slice request, initiates at least temporary storage of the encoded data slice of the write slice request. For example, the DST execution unit 1 stores the encoded data slice 1 in the memory 88 of the DST execution unit 1. As another example, the DST execution unit k attempts to store received encoded data slice k in the memory 88 of the DST execution unit k but may produce a storage error when the storage attempt is unsuccessful within the execution deadline.

Figure 4:
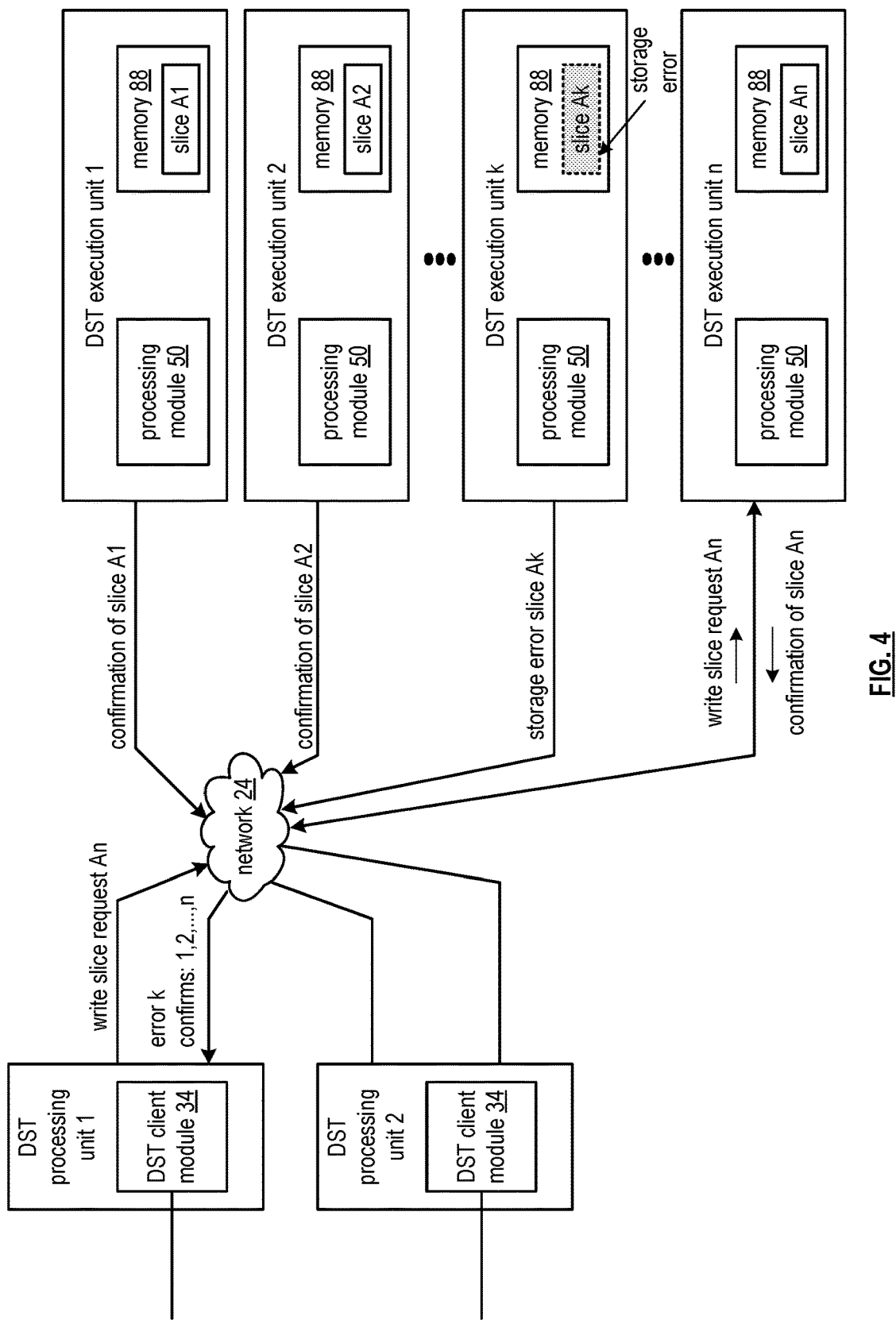

FIG. 4 illustrates further the example of operation of the accessing of the data where, when receiving the data request for execution by the DST execution unit, the DST execution unit compares the execution deadline to a current time (e.g., a current internal clock value of the DST execution unit). The comparing the execution deadline to the current time includes determining at least one estimated processing duration, where the at least one estimated processing duration includes an estimated un-accelerated processing duration and an estimated accelerated processing duration. The determining the estimated processing duration includes analyzing at least one of at least one request parameter indicated by the data request (e.g., a request type), at least one processing history parameter of the DST execution unit (e.g., a typical processing time for data requests), and at least one current load parameter of the DST execution unit (e.g., a number of current operations per second being processed). For example, the processing module 50 of the DST execution unit 1 determines the un-accelerated processing duration based on the current load parameter of the DST execution unit 1. As another example, the processing module 50 of the DST execution unit 2 determines the accelerated processing duration based on the at least one current load parameter of the DST execution unit 2.

The DST execution unit determines that the execution deadline compares favorably to the current time when addition of the at least one estimated processing duration to the current time does not exceed the execution deadline. The determining that the execution deadline compares favorably to the current time includes determining when the addition of the estimated accelerated processing duration to the current time does not exceed the execution deadline and the addition of the estimated un-accelerated processing duration to the current time exceeds the execution deadline. For example, the processing module 50 of the DST execution unit 2 determines that execution deadline 2 (e.g., execution deadline received by the DST execution unit 2) compares unfavorably to the current time when the addition of an estimated un-accelerated processing duration 2 (e.g., for DST execution unit 2) to the current time exceeds the execution deadline 2 and further determines that the execution deadline 2 compares favorably to the current time when the addition of an estimated accelerated processing duration 2 to the current time does not exceed the execution deadline 2. As another example, the processing module 50 of the DST execution unit k determines that an execution deadline k compares unfavorably to the current time when the addition of an estimated un-accelerated processing duration k to the current time exceeds execution deadline k and determines that the execution deadline k compares unfavorably to the current time when the addition of an estimated accelerated processing duration k to the current time exceeds the execution deadline k.

When the execution deadline compares unfavorably to the current time, the DST execution unit generates an error response. For example, the processing module 50 of the DST execution unit k generates the error response when the execution deadline k compares unfavorably to the current time (e.g., not possible to accelerate). For instance, the processing module 50 of the DST execution unit k generates message to indicate a storage error for slice Ak and sends, via the network 24, the storage error for slice Ak message to the DST processing unit 1.

When the execution deadline compares favorably to the current time, the DST execution unit issues a confirmation of storage of the received slice of the data request. For example, the DST execution unit 1 issues, via the network 24, a confirmation of storage of the slice A1 to the DST processing unit 1. Having received responses from the storage units, the DST processing unit 1 determines whether at least a decode threshold number of favorable responses have been received within a response timeframe. When the DST processing unit 1 detects that the at least a decode threshold number of favorable responses have not been received within the response timeframe, the DST processing unit 1 facilitates issuing one or more further write slice requests to one or more other storage units to store one or more other encoded data slices of the set of encoded data slices. For example, when one more favorably stored encoded data slice is required, the DST client module 34 issues, via the network 24, a write slice request An to the DST execution unit n to facilitate storage of the encoded data slice n in the memory 88 of the DST execution unit n.

When the execution deadline compares favorably to the current time, the DST execution unit further determines a priority level based on the execution deadline and executes the data request in accordance with the priority level. The determining the priority level based on the execution deadline includes ordering the execution deadline with at least one other execution deadline corresponding to at least one other data request received by the DST execution unit and setting the priority level based on the ordering. The executing of an the data request includes accelerating the executing of the data request when the addition of the estimated accelerated processing duration to the current time does not exceed the execution deadline and the addition of the estimated un-accelerated processing duration to the current time exceeds the execution deadline.

When executing the data request, the DST execution unit 1 may determine that the current time exceeds the execution deadline during the executing of the data request. The DST execution unit generates the error response further in response to the determining that the current time exceeds the execution deadline during the executing of the data request. For example, the DST execution unit k issues the error response (e.g., the storage error slice Ak) to the DST processing unit 1 while processing the write slice request Ak when determining that the current time exceeds execution deadline. Having issued the error response, the DST execution unit may further abort the executing of the data request in response to the determining that the current time exceeds the execution deadline during the executing of the data request.

Figure 5:
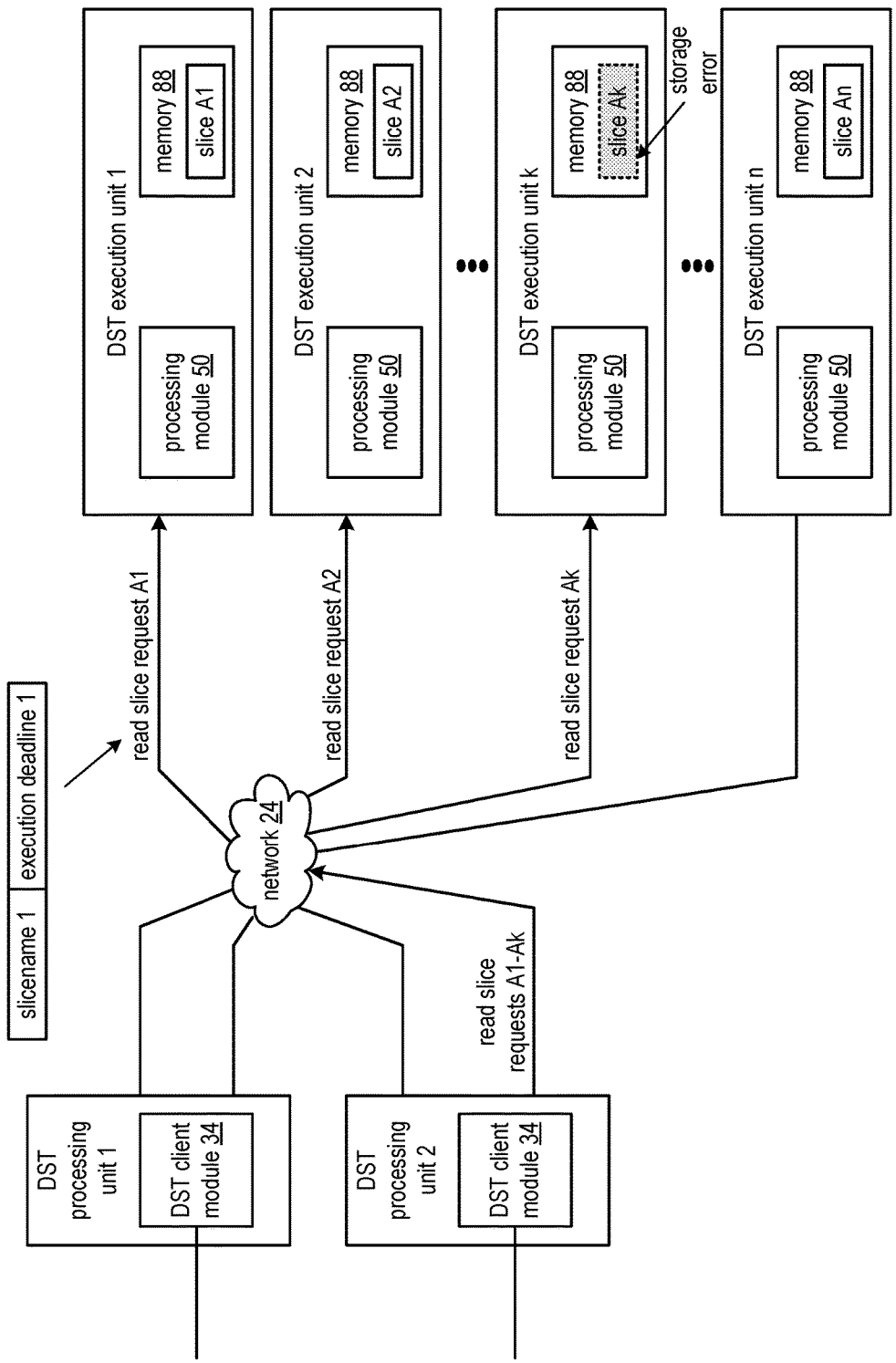

FIG. 5 illustrates another example of operation of the accessing of the data where the accessing of the data includes recovering stored data to reproduce the data. The DST processing unit 2 issues a set of data requests to the set of storage units to initiate recovery of the store data. When recovering the stored data, the data request includes a read request for one of the threshold number of data slices from each DST execution unit receiving a data request. For example, the DST client module 34 of the DST processing unit 2 issues read slice requests A1-Ak to the DST execution units 1-k, where each read slice request includes a slice name corresponding to an encoded data slice for recovery and the execution deadline for the recovery. For instance, the DST client module 34 issues, via the network 24, a read slice request A1 to the DST execution unit 1 to facilitate recovery of the encoded data slice A1.

Figure 6:
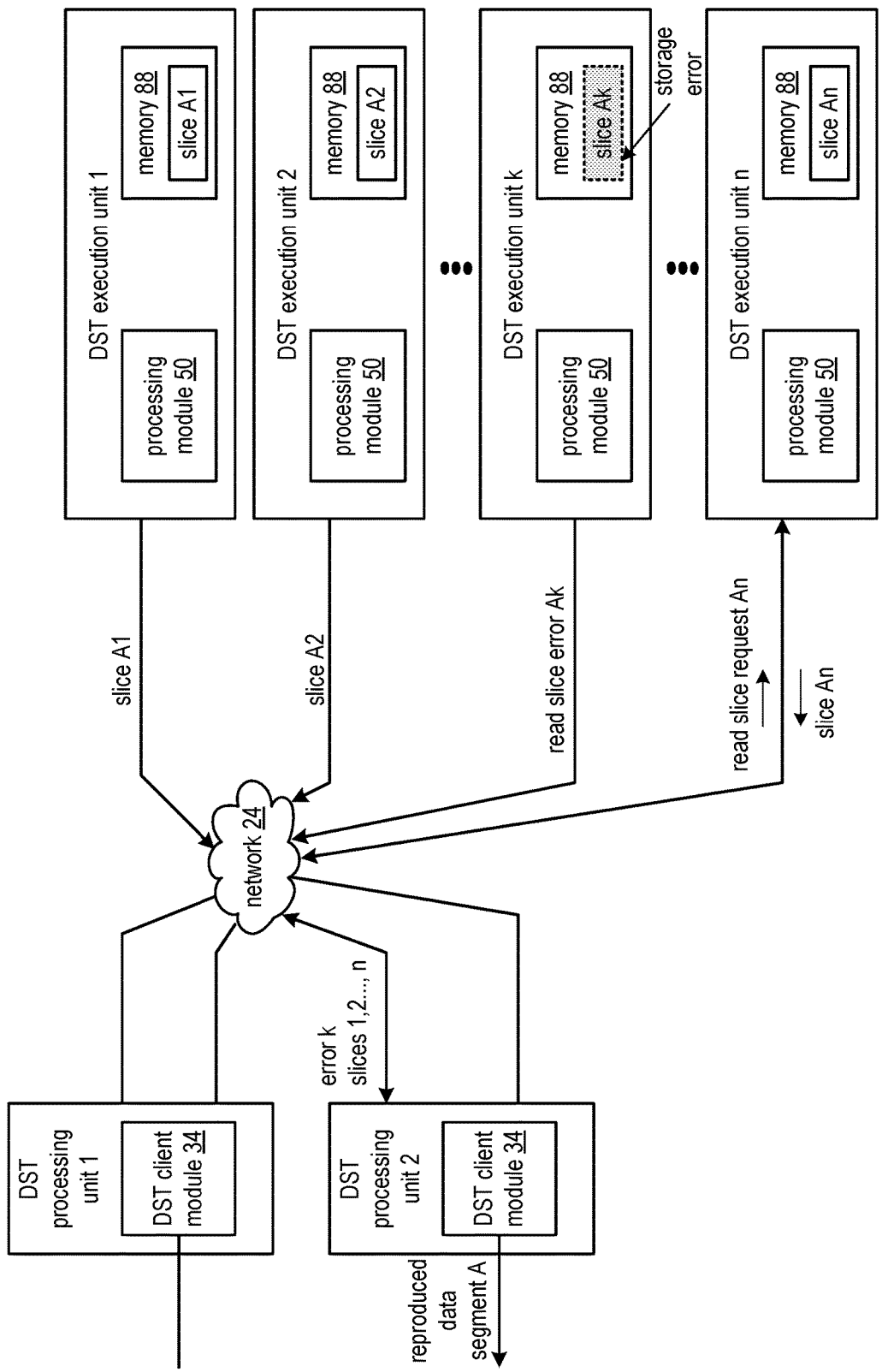

FIG. 6 illustrates further the example of operation of the accessing of the data where the accessing of the data includes recovering the stored data to reproduce the data. Having received the data request (e.g., a read slice requests), each DST execution unit receiving a corresponding data request compares the execution deadline of the received data request to a current time. The comparing includes determining at least one estimated processing duration, where the at least one estimated processing duration includes an estimated un-accelerated processing duration and an estimated accelerated processing duration. The determining the estimated processing duration includes analyzing at least one of at least one request parameter indicated by the data request (e.g., a type of data of the read slice request), at least one processing history parameter of the DST execution unit (e.g., an average historical processing duration to process read slice requests), or at least one current load parameter of the DST execution unit.

The DST execution unit determines that the execution deadline compares favorably to the current time when addition of the at least one estimated processing duration (e.g., for processing the read slice request) to the current time does not exceed the execution deadline. The determining that the execution deadline compares favorably to the current time includes determining when the addition of the estimated accelerated processing duration to the current time does not exceed the execution deadline and the addition of the estimated un-accelerated processing duration to the current time exceeds the execution deadline.

When the DST execution unit determines that the execution deadline compares unfavorably to the current time, the DST execution unit generates an error response. For example, the processing module 50 of the DST execution unit k issues, via the network 24, a read slice error Ak to the DST processing unit 2 indicating that recovery of the encoded data slice Ak cannot be accomplished within the execution deadline. Storage units able to provide a recovered encoded data slice before the execution deadline issue, via the network 24, a read slice response including a corresponding encoded data slice. For example, DST execution unit 1 sends, via the network 24, encoded data slice 1 to the DST processing unit 2. When fewer than a decode threshold number of favorable responses have been received by the DST processing unit two, the DST client module 34 of the DST processing unit 2 issues one or more additional read slice requests. For example, the DST client module 34 of the DST processing unit 2 issues a read slice request An to the DST execution unit n to recover encoded data slice An to form a decode threshold number of received encoded data slices. When receiving the decode threshold number of encoded data slices, the DST client module 34 of the DST processing unit 2 disperse storage error decodes the received decode threshold number of encoded data slices to generate a reproduced data segment A.

When the execution deadline compares favorably to the current time, the DST execution unit determines a priority level based on the execution deadline and executing the data request in accordance with the party level. The determining of the priority level includes ordering the execution deadline with at least one other execution deadline corresponding to at least one other data request received by the DST execution unit and setting the priority level based on the ordering. The executing of the data request includes accelerating the executing of the data request when the addition of the estimated accelerated processing duration to the current time does not exceed the execution deadline and the addition of the estimated un-accelerated processing duration to the current time exceeds the execution deadline. For example, the processing module 50 of the DST execution unit 2 may suspend other processes to accelerate the recovery of the encoded data slice A2.

When executing the data request, the DST execution unit may determine that the current time exceeds the execution deadline. The DST execution unit generates the error response and aborts the executing of the data request in response to the determining that the current time exceeds the execution deadline during the executing of the data request.

Figure 7:
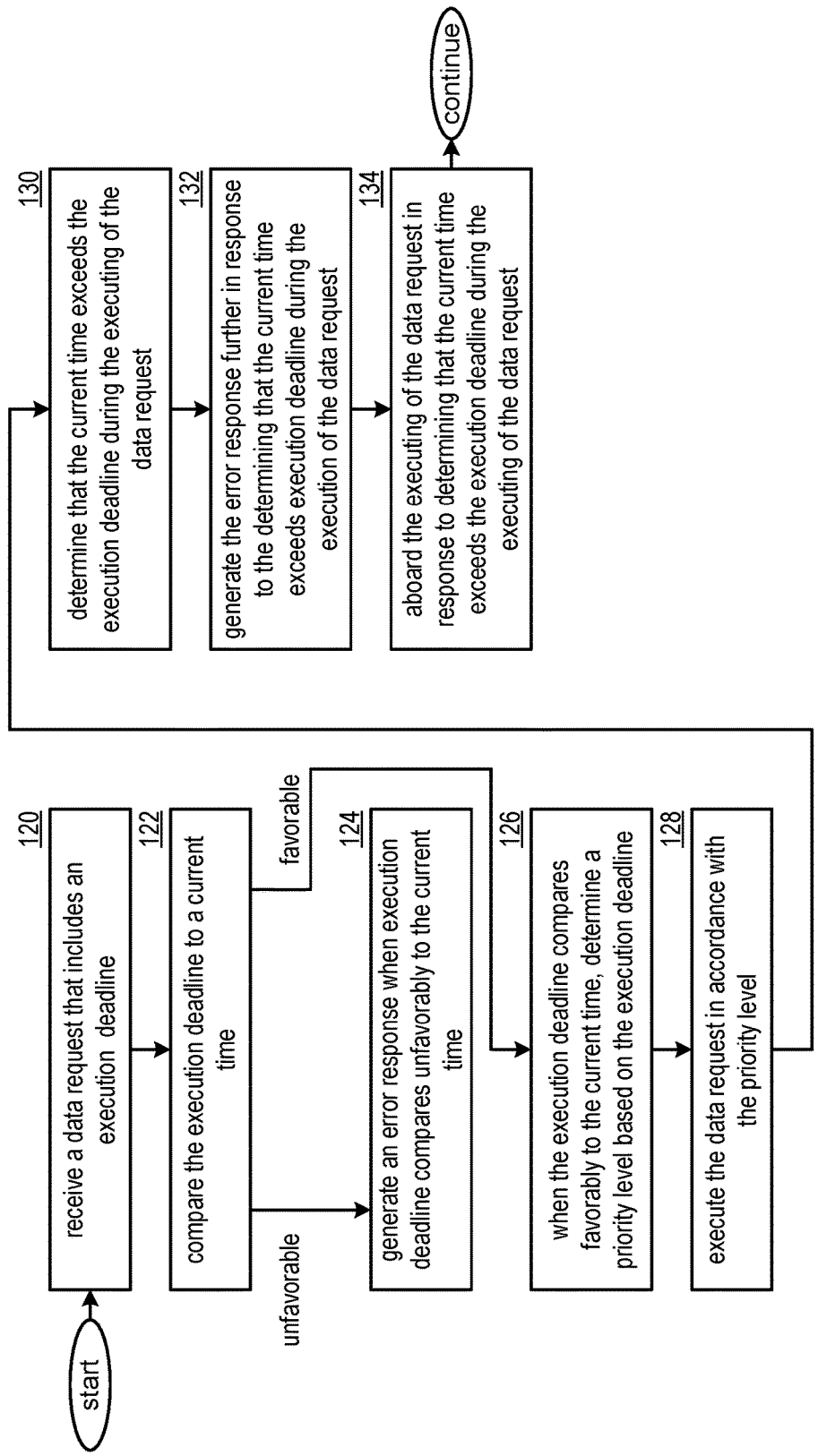
FIG. 7 is a flowchart illustrating an example of accessing data in accordance with an execution deadline in accordance with the present invention.

FIG. 7 is a flowchart illustrating an example of accessing data in accordance with an execution deadline. In particular, a method is presented for use in conjunction with one or more functions and features described in conjunction with FIGS. 1-2, 3-6, and also FIG. 7. The method includes step 120 where a processing module of a computing device (e.g., a distributed storage and task (DST) execution unit) of one or more computing devices of a dispersed storage network (DSN) receives a data request for execution by the DST execution unit, the data request including an execution deadline. For example, the processing module receives the data request from a requesting entity. The data corresponding to the data request includes time sensitive data and the execution deadline represents a time when value of the data is reduced. The data request further includes at least one of a write request to write one of a threshold number of data slices (e.g., a write threshold number, a decode threshold number) in the DST execution unit, a read request to read one of the threshold number of data slices (e.g., a read threshold number, the decode threshold number) from the DST execution unit, or a listing request.

The method continues at step 122 where the processing module compares the execution deadline to a current time. The comparing the execution deadline to the current time includes determining at least one estimated processing duration, where the at least one estimated processing duration includes an estimated un-accelerated processing duration and an estimated accelerated processing duration. The determining of the estimated processing duration includes analyzing at least one of at least one request parameter indicated by the data request, at least one processing history parameter of the DST execution unit, or at least one current load parameter of the DST execution unit. The processing module determines that the execution deadline compares favorably to the current time when addition of the at least one estimated processing duration to the current time does not exceed the execution deadline. The determining that the execution deadline compares favorably to the current time includes determining when the addition of the estimated accelerated processing duration to the current time does not exceed the execution deadline and the addition of the estimated un-accelerated processing duration to the current time exceeds the execution deadline. When the execution deadline compares favorably to the current time, the method branches to step 126. When the execution deadline compares unfavorably to the current time, the method continues to step 124. The method continues at step 124 where the processing module generates an error response when the execution deadline compares unfavorably to the current time. For example, the processing module issues the error response to the requesting entity to indicate that the execution deadline compares unfavorably to the current time.

When the execution deadline compares favorably to the current time, the method continues at step 126 where the processing module determines a priority level based on the execution deadline. The processing module determines the priority level based on the execution deadline including ordering the execution deadline with at least one other execution deadline corresponding to at least one other data request received by the DST execution unit and setting the priority level based on the ordering. The method continues at step 128 where the processing module executes the data request in accordance with the priority level. The executing of the data request includes a processing module accelerating the executing of the data request when the addition of the estimated accelerated processing duration to the current time does not exceed the execution deadline and the addition of the estimated un-accelerated processing duration to the current time exceeds the execution deadline.

The method continues at step 130 where the processing module determines that the current time exceeds the execution deadline during the executing of the data request. The method continues at step 132 where the processing module generates the error response further in response to the determining that the current time exceeds the execution deadline during the executing of the data request. The method continues at step 134 where the processing module aborts the executing of the data request in response to the determining that the current time exceeds the execution deadline during the executing of the data request.

The method described above in conjunction with the processing module can alternatively be performed by other modules of the dispersed storage network or by other devices. For example, any combination of a first module, a second module, a third module, a fourth module, etc. of the computing device may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of a dispersed storage and task (DST) execution unit that includes a processor, the method comprises:

receiving a data request for execution by the DST execution unit, the data request including an execution deadline;

comparing the execution deadline to a current time, which includes:

determining an estimated un-accelerated processing duration and an estimated accelerated processing duration;

determining that the execution deadline compares favorably to the current time when an addition of the estimated un-accelerated processing duration to the current time does not exceed the execution deadline; and determining that the execution deadline compares favorably to the current time when an addition of the estimated accelerated processing duration to the current time does not exceed the execution deadline and the addition of the estimated un-accelerated processing duration to the current time exceeds the execution deadline;

generating an error response when the execution deadline compares unfavorably to the current time; and when the execution deadline compares favorably to the current time:

determining a priority level based on the execution deadline; and executing the data request in accordance with the priority level, wherein executing the data request includes accelerating the executing of the data request when the addition of the estimated accelerated processing duration to the current time does not exceed the execution deadline and the addition of the estimated un-accelerated processing duration to the current time exceeds the execution deadline.

2. The method of claim 1 wherein the data request includes at least one of:
   a write request to write one of a threshold number of data slices in the DST execution unit;
   a read request to read one of the threshold number of data slices from the DST execution unit; or
   a listing request.

3. The method of claim 1 wherein the determining the estimated un-accelerated processing duration includes analyzing at least one of:
   at least one request parameter indicated by the data request;
   at least one processing history parameter of the DST execution unit; or
   at least one current load parameter of the DST execution unit.

4. The method of claim 1 wherein the determining the priority level based on the execution deadline includes:
   ordering the execution deadline with at least one other execution deadline corresponding to at least one other data request received by the DST execution unit; and
   setting the priority level based on the ordering.

5. The method of claim 1 further comprising:
   determining that the current time exceeds the execution deadline during the executing of the data request; and
   generating the error response further in response to the determining that the current time exceeds the execution deadline during the executing of the data request.

6. The method of claim 5 further comprising:
   aborting the executing of the data request in response to the determining that the current time exceeds the execution deadline during the executing of the data request.

7. The method of claim 1 wherein data corresponding to the data request is time sensitive and wherein the execution deadline represents a time when value of the data is reduced.

8. A dispersed storage and task (DST) execution unit comprises:
   a processing system including a processor and a memory that is configured to:
     receive a data request for execution by the DST execution unit, the data request including an execution deadline;
     compare the execution deadline to a current time by:
       determining an estimated un-accelerated processing duration and an estimated accelerated processing duration;
       determining that the execution deadline compares favorably to the current time when an addition of the estimated un-accelerated processing duration to the current time does not exceed the execution deadline; and
       determining that the execution deadline compares favorably to the current time when an addition of the estimated accelerated processing duration to the current time does not exceed the execution deadline and the addition of the estimated un-accelerated processing duration to the current time exceeds the execution deadline;
     generate an error response when the execution deadline compares unfavorably to the current time; and
     when the execution deadline compares favorably to the current time:
       determine a priority level based on the execution deadline; and
       execute the data request in accordance with the priority level, wherein executing the data request includes accelerating the executing of the data request when the addition of the estimated accelerated processing duration to the current time does not exceed the execution deadline and the addition of the estimated un-accelerated processing duration to the current time exceeds the execution deadline.

9. The DST execution unit of claim 8 wherein the data request includes at least one of:
   a write request to write one of a threshold number of data slices in the DST execution unit;
   a read request to read one of the threshold number of data slices from the DST execution unit; or
   a listing request.

10. The DST execution unit of claim 8 wherein determine the estimated un-accelerated processing duration includes analyzing at least one of:
    at least one request parameter indicated by the data request;
    at least one processing history parameter of the DST execution unit; or
    at least one current load parameter of the DST execution unit.

11. The DST execution unit of claim 8 wherein determine the priority level based on the execution deadline includes:
    ordering the execution deadline with at least one other execution deadline corresponding to at least one other data request received by the DST execution unit; and
    setting the priority level based on the ordering.

12. The DST execution unit of claim 8 wherein the processing system is further configured to:
    determine that the current time exceeds the execution deadline during the execution of the data request; and
    generate the error response further in response to determining that the current time exceeds the execution deadline during the execution of the data request.

13. The DST execution unit of claim 12 wherein the processing system is further configured to:
    abort the execution of the data request in response to determining that the current time exceeds the execution deadline during the execution of the data request.

14. The DST execution unit of claim 8 wherein data corresponding to the data request is time sensitive and wherein the execution deadline represents a time when value of the data is reduced.

15. A non-transitory computer readable storage medium comprises:
    at least one memory section that stores operational instructions that, when executed by one or more processing modules of one or more computing devices of a dispersed storage network (DSN), causes the one or more computing devices to:
      receive a data request for execution by the one or more computing devices, the data request including an execution deadline;
      compare the execution deadline to a current time by:
        determining an estimated un-accelerated processing duration and an estimated accelerated processing duration;
        determining that the execution deadline compares favorably to the current time when an addition of the estimated un-accelerated processing duration to the current time does not exceed the execution deadline; and determining that the execution deadline compares favorably to the current time when an addition of the estimated accelerated processing duration to the current time does not exceed the execution deadline and the addition of the estimated un-accelerated processing duration to the current time exceeds the execution deadline;

generate an error response when the execution deadline compares unfavorably to the current time; and when the execution deadline compares favorably to the current time:

determine a priority level based on the execution deadline; and execute the data request in accordance with the priority level, wherein executing the data request includes accelerating the executing of the data request when the addition of the estimated accelerated processing duration to the current time does not exceed the execution deadline and the addition of the estimated un-accelerated processing duration to the current time exceeds the execution deadline.

16. The non-transitory computer readable storage medium of claim 15 wherein the data request includes at least one of:

a write request to write one of a threshold number of data slices;

a read request to read one of the threshold number of data slices; or a listing request.

* * * * *